(12) United States Patent
Nagashima et al.

(10) Patent No.: US 7,225,294 B2
(45) Date of Patent: May 29, 2007

(54) STORAGE SYSTEM CONTROL METHOD, STORAGE SYSTEM, INFORMATION PROCESSING SYSTEM, MANAGING COMPUTER AND PROGRAM

(75) Inventors: Yuichiro Nagashima, Yokohama (JP); Takashi Kitayama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 171 days.

(21) Appl. No.: 10/651,681

(22) Filed: Aug. 29, 2003

(65) Prior Publication Data
US 2004/0172510 A1 Sep. 2, 2004

(30) Foreign Application Priority Data
Feb. 28, 2003 (JP) ............................. 2003-052745

(51) Int. Cl.
*G06F 12/00* (2006.01)
(52) U.S. Cl. ...................................... 711/114; 711/162
(58) Field of Classification Search ................ 711/114, 711/161, 162
See application file for complete search history.

(56) References Cited

U.S. PATENT DOCUMENTS

| | | | |
|---|---|---|---|
| 6,366,987 B1* | 4/2002 | Tzelnic et al. ................. | 711/62 |
| 6,442,706 B1* | 8/2002 | Wahl et al. ..................... | 714/6 |
| 6,493,729 B2 | 12/2002 | Gusler et al. | |
| 6,557,073 B1* | 4/2003 | Fujiwara et al. ............. | 711/111 |
| 6,772,304 B2* | 8/2004 | Hino et al. .................. | 711/162 |
| 6,836,830 B1 | 12/2004 | Yamagami et al. | |
| 6,907,543 B2* | 6/2005 | Hino et al. .................... | 714/4 |
| 2002/0023198 A1* | 2/2002 | Kokubun et al. ........... | 711/162 |
| 2003/0005120 A1* | 1/2003 | Mutalik et al. .............. | 709/225 |
| 2003/0046602 A1* | 3/2003 | Hino et al. .................... | 714/4 |
| 2003/0088746 A1* | 5/2003 | Hino et al. .................. | 711/162 |
| 2003/0101228 A1* | 5/2003 | Busser et al. ............... | 709/214 |
| 2003/0177323 A1* | 9/2003 | Popp et al. .................. | 711/162 |
| 2003/0200275 A1* | 10/2003 | Hirabayashi et al. ....... | 709/214 |
| 2004/0073831 A1* | 4/2004 | Yanai et al. ................... | 714/7 |
| 2004/0088380 A1* | 5/2004 | Chung et al. ............... | 709/219 |
| 2004/0088417 A1 | 5/2004 | Bober et al. | |
| 2004/0103254 A1* | 5/2004 | Satoyama et al. .......... | 711/150 |
| 2004/0205293 A1 | 10/2004 | Asahi | |

FOREIGN PATENT DOCUMENTS

JP 2001318833 11/2001

\* cited by examiner

*Primary Examiner*—Matthew Kim
*Assistant Examiner*—Ryan A. Dare
(74) *Attorney, Agent, or Firm*—Townsend and Townsend and Crew

(57) ABSTRACT

When shifting the condition of a pair of a main volume and a sub-volume from a split condition to a pair condition according to a request from a user, an information processing unit which can access the sub-volume is inquired whether it mounts the sub-volume or not. As a result, if a managing computer receives a notice from the information processing unit that it mounts the sub-volume, the managing computer displays a warning on its display. Thereby, data on the sub-volume can be prevented from being erased by an operation mistake of the user.

16 Claims, 5 Drawing Sheets

| PAIR CONDITION CHANGE | | | | | | | |
|---|---|---|---|---|---|---|---|
| | STORAGE DEVICE | LOGICAL VOLUME | ROLE | CONDITION OF PAIR | CHANGE OF CONDITION | PAIRED LOGICAL VOLUME | |
| | | | | | | STORAGE DEVICE | LOGICAL VOLUME |
| | #A | #1 | MAIN VOLUME | SPLIT CONDITION | SPLIT CONDITION ▼ | #A | #2 |
| | #A | #2 | SUB-VOLUME | SPLIT CONDITION | SPLIT CONDITION ▼ | #A | #1 |
| | #A | #3 | SUB-VOLUME | PAIR CONDITION | PAIR CONDITION / SPLIT CONDITION | #B | #1 |
| | #A | #4 | – | – | – | – | – |
| | #B | #1 | MAIN VOLUME | PAIR CONDITION | PAIR CONDITION ▼ | #A | #3 |

FIG. 5

PAIR CONDITION CHANGE

| STORAGE DEVICE | LOGICAL VOLUME | ROLE | CONDITION OF PAIR | CHANGE OF CONDITION | PAIRED LOGICAL VOLUME | |
|---|---|---|---|---|---|---|
| | | | | | STORAGE DEVICE | LOGICAL VOLUME |
| #A | #1 | MAIN VOLUME | SPLIT CONDITION | SPLIT CONDITION ▶ | #A | #2 |
| #A | #2 | SUB-VOLUME | SPLIT CONDITION | SPLIT CONDITION ▶ | #A | #1 |
| #A | #3 | SUB-VOLUME | PAIR CONDITION | PAIR CONDITION / SPLIT CONDITION | #B | #1 |
| #A | #4 | – | – | – | – | – |
| #B | #1 | MAIN VOLUME | PAIR CONDITION | PAIR CONDITION ▶ | #A | #3 |

FIG. 6

WARNING

THIS SUB-VOLUME IS MOUNTED AT INFORMATION PROCESSING UNIT XX.

IF YOU PERFORM THIS OPERATION THERE IS A POSSIBILITY THAT THE CONTENTS OF THE SUB-VOLUME ARE ERASED.

DO YOU WANT TO CONTINUE THE PROCESS? (y/n)

| Yes | No |

FIG. 7

CHANGE OF THE PAIR CONDITION IS COMPLETED.

OK

STORAGE SYSTEM CONTROL METHOD, STORAGE SYSTEM, INFORMATION PROCESSING SYSTEM, MANAGING COMPUTER AND PROGRAM

FIELD OF THE INVENTION

The present invention relates to a storage system control method, a storage system, an information processing unit, a managing computer, and a program.

BACKGROUND OF THE INVENTION

In a storage system comprising an information processing unit and a disk array unit connected thereto, it is known a function which stores a duplicate of data stored in a storage volume (hereinafter it is called a main volume) also in another storage volume (hereinafter it is called a sub-volume) to redundantly control data stored in the main volume (hereinafter it is called a duplication management function).

Also, as an operation technique of the duplication management function a technique is known which makes it possible to mutually shift between each condition of a condition in which when data is written to the main volume it is controlled to store a duplicate of the data in the sub-volume in real time (hereinafter it is called a pair condition) and a condition in which the pair condition is suspended and the data is not reflected to the sub-volume (hereinafter it is called a split condition).

Here, the shift from the pair condition to the split condition is performed, for example, when the user wants to use data in the main volume without affecting the information processing unit using the main volume. By shifting to the split condition, the sub-volume can be utilized for a use independent of the main volume. Here, as a process which applied to the sub-volume in the split condition, for example, there are a backup process, a process of accumulation or analysis of data, and the like.

After the process using the sub-volume is performed, the shift from the split condition to the pair condition is performed. Further, at this shift, a process to duplicate data which was not reflected to the sub-volume from the main volume to the sub-volume is performed prior to the shift to make the contents of the sub-volume consistent with the contents of the main volume.

As the prior art, refer to JP-A-2001-318833.

SUMMARY OF THE INVENTION

Here, if the shift from the split condition to the pair condition is performed when the sub-volume is used for a certain process and data unrelated to the main volume is generated in the split condition, the process to duplicate data which was not reflected to the sub-volume from the main volume to the sub-volume is initiated, whereby the data unrelated to the main volume in the sub-volume is destroyed and the certain process is hindered. For this reason, at the shift from the split condition to the pair condition, it is needed a mechanism not to affect the data unrelated to the main volume which was generated by the certain process.

The present invention has been made in consideration of such situation, and its primary object is to provide a storage system control method, a storage system, an information processing unit, a managing computer, and a program.

According to one feature of the present invention there is provided a storage system control method for a storage system which comprises a plurality of information processing units, a storage device provided with a plurality of logical volumes, and a user interface, and controls to perform a first process in which when a data write request to a first logical volume is sent from the information processing unit to the storage device, the storage device stores the data in the first logical volume and also stores the data in a second logical volume, controls to perform a second process in which the storage device suspends the first process, and controls to shift from the second process to the first process to perform the first process, the method comprising the steps of: when shifting from the second process to the first process to perform the first process, inquiring an information processing unit which can access the second logical volume of whether it mounts the second logical volume or not; deciding whether the information processing unit mounts the second logical volume or not; and notifying the user of that effect by the user interface when the information processing unit mounts the second logical volume.

Here, the storage system is a system applied to, for example, business of online or accounting and the like of bank, inventory control in trading company or distribution company, seat reservation in railroad corporation or airline company, and the like. The information processing unit is a personal computer or a main frame computer which accesses a storage device via SAN or LAN. Further, the storage device is a disk array unit and the like which stores data in a logical volume responding to an input/output request of the data sent from the information processing unit. The logical volume is a storage area which is set logically on a physical storage area provided by a physical disk equipped in the storage device.

Additionally, the subject and its solution which the present invention discloses will become apparent from the following detailed description of the embodiments and the accompanying drawings.

BRIEF DESCRIPTION OF THE DRAWINGS

Embodiments of the present invention will now be described in detail in conjunction with the accompanying drawings, in which:

FIG. 5 shows an example of a setting Web page according to an embodiment of the present invention.

FIG. 6 shows an example of a warning screen displayed on a display of a managing computer 700 according an embodiment of the present invention.

FIG. 7 shows an example of a message displayed on a display of a managing computer 700 according to an embodiment of the present invention.

DESCRIPTION OF THE EMBODIMENTS

Example of Overall Configuration

<Storage System>

Figure 1:
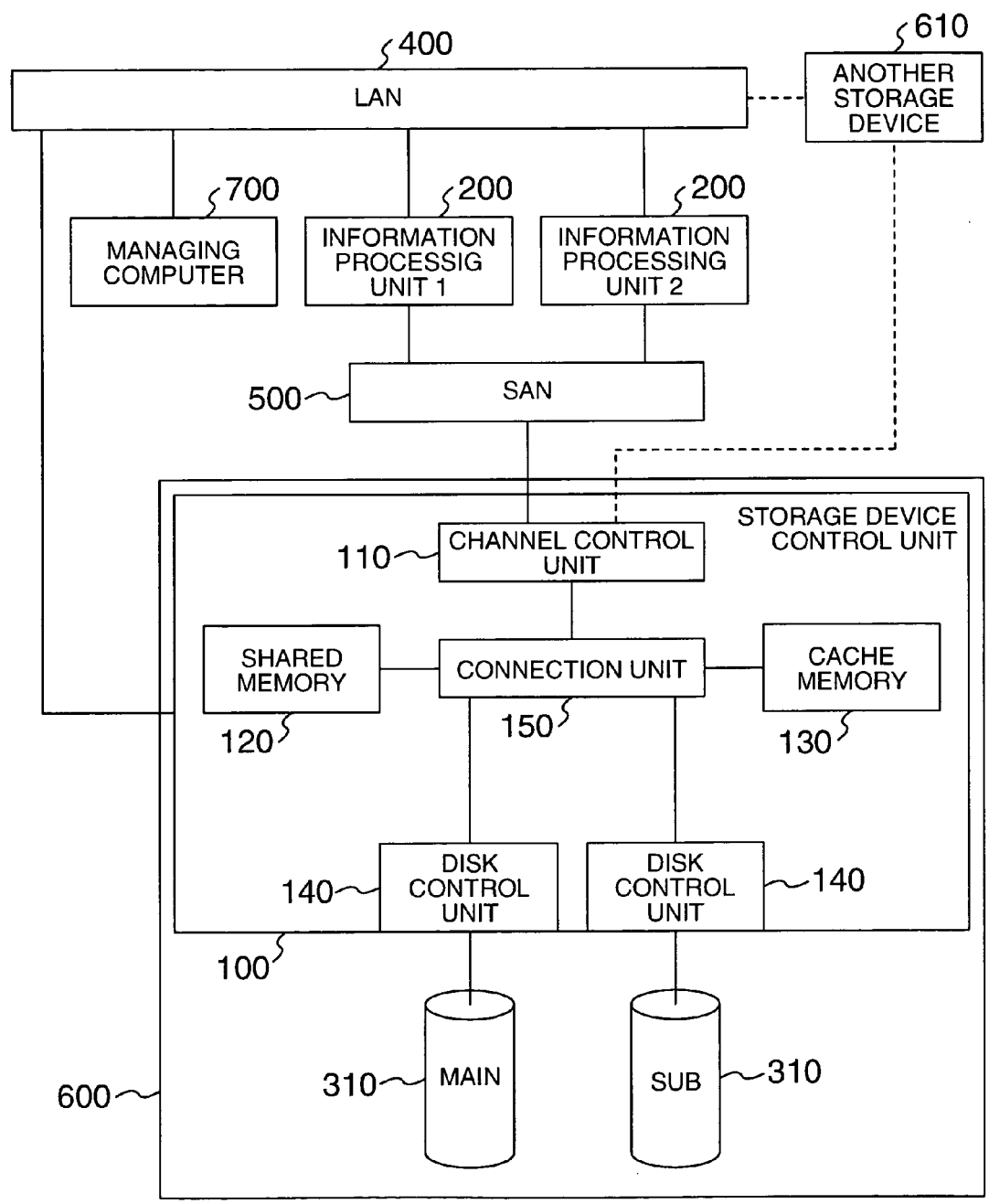
FIG. 1 is a block diagram showing the overall configuration of a storage system according to an embodiment of the present invention.

First, the overall configuration of the storage system according to an embodiment of the present invention will be described. FIG. 1 is a block diagram showing the overall configuration of the storage system according to an embodiment of the present invention. The storage system is constructed comprising an information processing unit 200, a storage device 600, a managing computer 700, and so on. The storage system is a system applied to, for example, business of online or accounting and the like of bank, inventory control in trading company or distribution company, seat reservation in railroad corporation or airline company, and the like.

<Information Processing Unit>

The information processing unit 200 is, for example, a personal computer, a workstation, a main frame computer, and the like. The information processing unit 200 is provided with a CPU (Central Processing Unit), a memory, and a user interface. The user interface includes, for example, a display, a keyboard, a mouse, a printer, a speaker, and the like. The CPU of the information processing unit 200 is in charge of the overall control of the information processing unit 200, and implements a variety of functions and the like by executing programs stored in the memory.

In FIG. 1 the information processing unit 200 is connected to a storage device control unit 100 of the storage device 600 via a SAN (Storage Area Network) 500. The SAN 500 is a network to send and receive data to and from the information processing unit 200 using as a unit a block which is a managing unit of data in a storage area provided by a physical disk (a disk drive) of the storage device 600. The SAN 500 may be an internet or a dedicated network. The communication between the information processing unit 200 and the storage device control unit 100 via the SAN 500 is generally performed according to the Fibre Channel Protocol. From the information processing unit 200, a data access request in block units (hereinafter it is called a block access request) is sent to the storage device 600 according to the Fibre Channel Protocol.

Further, the connection between the information processing unit 200 and the storage device control unit 100 may be a connection via a LAN (Local Area Network) 400 or may be a direct connection. When they are connected via the LAN 400, the communication between the information processing unit 200 and the storage device control unit 100 is performed, for example, according to the TCP/IP protocol. In this case, a data access request designating a file name (data input/output request in file units) is sent from the information processing unit 200 to the storage device 600.

In case where the information processing unit 200 and the storage device control unit 100 are connected directly, the communication between the information processing unit 200 and the storage device control unit 100 is performed according to a communication protocol, for example, FICON (Fibre Connection)(a registered trademark), ESCON (Enterprise System Connection)(a registered trademark), ACONARC (Advanced Connection Architecture)(a registered trademark), FIBARC (Fibre Connection Architecture) (a registered trademark), and the like. From the information processing unit 200 a block access request is sent to the storage device 600 according to these communication protocols.

The information processing unit 200 is connected to the managing computer 700 via the LAN 400. The LAN 400 may be an internet or a dedicated network. The communication between the information processing unit 200 and the managing computer 700 via the LAN 400 is performed, for example, according to the TCP/IP protocol.

Moreover, the SAN 500 may have a backup device corresponding to SAN connected thereto. More specifically, the backup device is a disk type device such as MO, CD-R, DVD-RAM or a tape type device such as DAT tape, cassette tape, open tape, cartridge tape. The backup device corresponding to SAN stores a backup data of data stored in the logical volume 310 by communicating with the storage device control unit 100 via the SAN 500.

<Storage Device>

An example of the configuration of the storage device 600 will be described in detail below, but as the configuration of another storage device 610 may be the same the description of the configuration of another storage device 610 will be omitted.

The storage device 600 is, for example, a disk array unit or a semiconductor storage device. The storage device 600 is provided with the storage device control unit 100 and a physical disk.

The storage device control unit 100 controls the physical disk according to commands received from the information processing unit 200. For example, when it receives the data input/output request from the information processing unit 200 it performs a process to input or output data stored in the physical disk. The data is stored in the logical volume 310 which is a storage area logically set in the physical storage area provided by the physical disk equipped in the storage device 600. Further, the storage device control unit 100 sends and receives a plurality of kinds of commands to control the storage device 600 to and from the managing computer 700 and the information processing unit 200.

The storage device control unit 100 is constructed which comprises a channel control unit 110, a shared memory 120, a cache memory 130, a disk control unit 140, a connection unit 150, and so on.

The channel control unit 110 is provided with a communication interface to communicate with the information processing unit 200 and a function to send and receive commands such as a data input/output command to and from the information processing unit 200. For example, the channel control unit 110 receives a block access request from the information processing unit 200, and accesses the physical disk by outputting an I/O request corresponding to the block access request searching for a memory address of file or data length. Thereby the storage device 600 can provide the information processing unit 200 with a data storage service which can be accessed at high speed. Further, in the I/O request a head address of the data, data length, the kind of access such as read or write are included. And, in case of data writing, the I/O request may include write data.

The connection unit 150 connects mutually the channel control unit 110, the shared memory 120, the cache memory 130, and the disk control unit 140. Sending and receiving of data and commands between the channel control unit 110, the shared memory 120, the cache memory 130, and the disk control unit 140 is performed via the connection unit 150. The connection unit 150 is, for example, a high speed bus such as a very high speed crossbar switch which transmits data by high speed switching.

The shared memory 120 and the cache memory 130 are storage memories which are shared by the channel control unit 110 and the disk control unit 140. The shared memory 120 is used primarily to store control information and commands and the like, on the other hand, the cache memory 130 is used primarily to store data.

For example, when a data input/output command which a certain channel control unit 110 has received from the information processing unit 200 is a write command, the channel control unit 110 writes a write command to the shared memory 120 and also writes write data which it has received from the information processing unit 200 to the cache memory 130. On the other hand, the disk control unit 140 monitors the shared memory 120 and when it detects that the write command has been written in the shared memory 120, it reads out the write data from the cache memory 130 and writes it to the physical disk according to the command. Then, when the channel control unit 110 detects that the write object data has been written in the cache memory 130 by monitoring the shared memory 120, it sends a write completion notice of the data to the information processing unit 200.

Alternatively, when a data input/output command which a certain channel control unit 110 has received from the information processing unit is a read command, the channel control unit 110 writes a read command to the shared memory 120 and also checks whether a read object data exists in the cache memory 130 or not. Then, if the data exists in the cache memory 130, the channel control unit 110 sends the data to the information processing unit 200. On the other hand, if the read object data does not exist in the cache memory 130, the disk control unit 140 monitors the shared memory 120. When the disk control unit 140 detects that the read command has been written in the shared memory 120, the disk control unit 140 reads out the read object data from the physical disk and writes this data to the cache memory 130 and also writes to that effect to the shared memory 120. Then, when the channel control unit 110 detects that the read object data has been written in the cache memory 130 by monitoring the shared memory 120, it sends a read completion notice of the data to the information processing unit 200.

Moreover, other than the structure to send the directive of data writing or reading from the channel control unit 110 to each disk control unit 140 indirectly via the shared memory 120 like this, for example, it may be constructed to send the directive of data writing or reading from the channel control unit 110 to the disk control unit 140 directly without going through the shared memory 120.

Each disk control unit 140 controls the physical disk. For example, as described above, the disk control unit 140 writes data to the physical disk according to the data write command which the channel control unit 110 received from the information processing unit 200. Also, it converts a block access request by designating a logical address to the logical volume 310 sent from the channel control unit 110 to a block access request by designating a physical address to the physical disk. In case where the physical disk of the storage device 600 is managed by the RAID (Redundant Array of Inexpensive Disk Drives), it performs data access to the physical disk according to the RAID configuration (e.g., RAID 0, 1, 5). Also, the disk control unit 140 controls duplication management and backup of data stored in the logical volume 310. Further, the disk control unit 140 also performs control such as control (data replication function (remote duplication)) to store the duplicate of the data in the storage device 600 in a primary site also in another storage device 610 located in a secondary site with the purpose such as of avoiding data erasure when a disaster occurs (disaster recovery).

The storage device 610 may be connected to the storage device 600 by a communication line such as ATM (Asynchronous Transfer Mode). In this case, for example, a channel control unit 110 provided with an interface (channel extender) to use the communication line is adopted as a channel control unit 110. Further, the storage device 600 and another storage device 610 may be connected via the SAN 500.

In the embodiment of the present invention, there has been described the case where the shared memory 120 and the cache memory 130 are provided independently of the channel control unit 110 and the disk control unit 140, but the embodiment is not limited to this case, and the shared memory 120 and the cache memory 130 may be provided in each of the channel control unit 110 and the disk control unit 140 in a distributed manner. In this case, the connection unit 150 connects mutually the channel control unit 110 and the disk control unit 140 comprising the distributed shared memory and cache memory.

<Physical Disk>

A disk array by the RAID (Redundant Array of Inexpensive Disk Drives) can be constructed by a plurality of physical disks. Therefore, a logical volume 310 which is provided to the information processing unit 200 can be provided by a plurality of physical disks managed by the RAID. As a physical disk, for example, a variety of units such as a hard disk unit, a flexible disk unit, a semiconductor storage device can be used.

The storage device control unit 100 and the physical disk may be connected directly as shown in FIG. 1 or they may be connected via a network. Further, the physical disk may be constructed as integrated in the storage device control unit 100.

<Managing Computer>

The managing computer 700 is a computer to maintain and manage the storage device 600 and another storage device 610 which are connected by the LAN 400. Also, a function of maintaining and managing the storage device 600 and another storage device 610 may be installed in the information processing unit 200.

The managing computer 700 is provided with a CPU, a memory, a user interface, and so on, like the information processing unit 200. The user interface is, for example, a display, a keyboard, a mouse, a printer, a speaker, and the like. The CPU of the managing computer 700 is in charge of the overall control of the managing computer 700, and implements a variety of functions and the like by executing programs stored in the memory.

By that the user and the like operates the managing computer 700, for example, setting of the configuration of the physical disk, management and setting of the logical volume 310 (capacity management, expansion and reduction of capacity, allocation of the information processing unit 200, etc.), setting and control (setting LU of the duplicate origin and LU of the duplicate destination) relating to the function of the above-mentioned duplication management or data replication (remote copy) and the like, installation of microprograms executed in the storage device 600, etc., can be performed. Here, as a setting of the configuration of the physical disk, for example, expansion or reduction of the physical disk, change in the RAID configuration (e.g., from RAID 1 to RAID 5), etc., can be performed. Moreover, from the managing computer 700, operations such as confirmation of an operating condition and specification of a failure part of the storage device 600, installation of an operating system executed at the storage device 600, and the like, can be performed. These settings are performed by the user and the like using a Web Page which is provided by a Web server operating at the managing computer 700 as a user interface. Also, the user interface may be not only the one by the vision but also the one which makes people perceive by the senses other than the vision.

The managing computer 700 may be integrated in the storage device control unit 100 or may be attached thereto on its exterior. The managing computer 700 may be a computer dedicated to the maintenance and management of the storage device control unit 100 and the physical disk or may be a general purpose computer which is arranged to have a function of maintenance and management.

Hardware Configuration

<Channel Control Unit>

Figure 2:
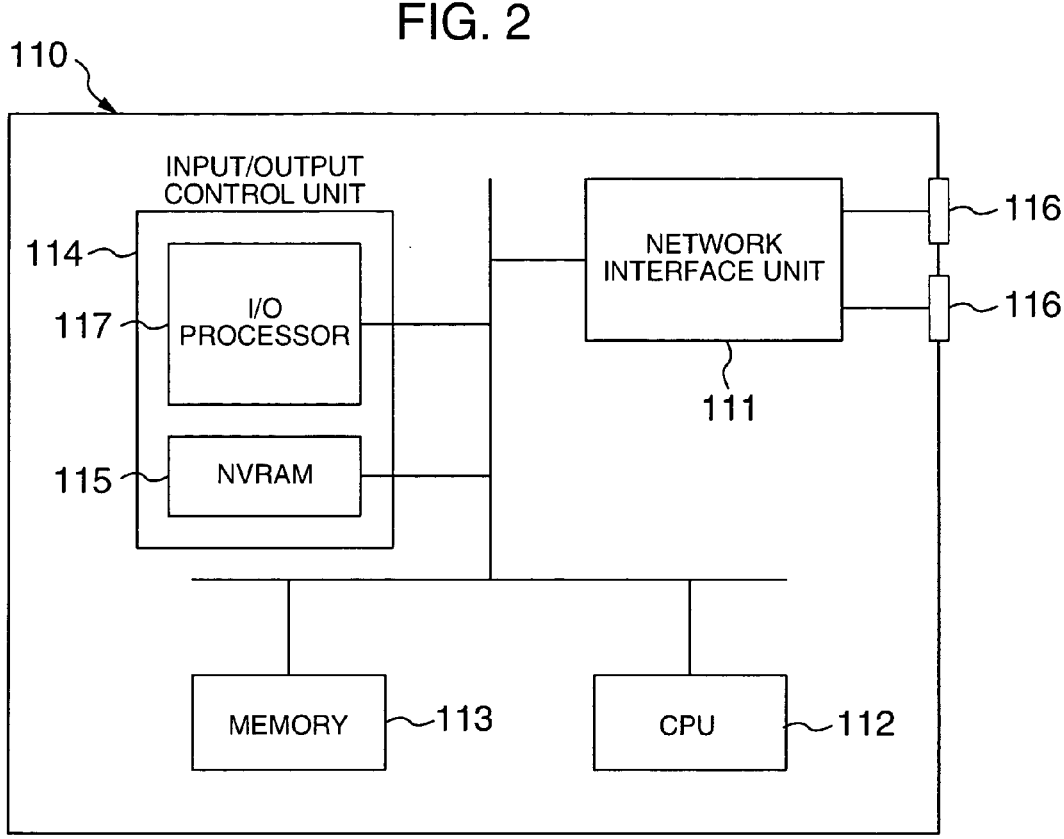
FIG. 2 shows the hardware configuration of a channel control unit 110 according to an embodiment of the present invention.

The storage device 600 according to the embodiment of the present invention receives a block access request from the information processing unit 200 by the channel control unit 110 and provides the information processing unit 200 with a service as a SAN as described above. FIG. 2 shows the hardware configuration of the channel control unit 110. The channel control unit 110 is provided with a network interface unit 111, a CPU 112, a memory 113, an input/output control unit 114, an I/O processor 117, a nonvolatile RAM (NVRAM) 115, and a communication connector 116.

The network interface unit 111 is provided with a communication interface to communicate with the information processing unit 200 and receives a block access request sent from the information processing unit 200 according to, for example, the Fibre Channel Protocol.

The communication connector 116 is a connector which communicates with the information processing unit 200, the managing computer 700, another storage device 610, and so on. The communication connector 116 is a connector which is able to be connected to the SAN 500, the LAN 400, the ATM and the like.

The input/output control unit 114 is in charge of the overall control of the channel control unit 110 and also sends and receives data and commands to and from the disk control unit 140, the cache memory 130, and the shared memory 120. The function of the channel control unit 110 is implemented by executing a plurality of kinds of programs stored in the memory 113.

The input/output control unit 114 is provided with the I/O processor 117 and a NVRAM 115. The I/O processor 117 controls the above-mentioned sending and receiving of data and commands. The NVRAM 115 is a nonvolatile memory which stores program in charge of the control of the I/O processor 117. The contents of the program stored in the NVRAM 115 can be written or rewritten by a directive from the managing computer 700.

<Disk Control Unit>

Figure 3:
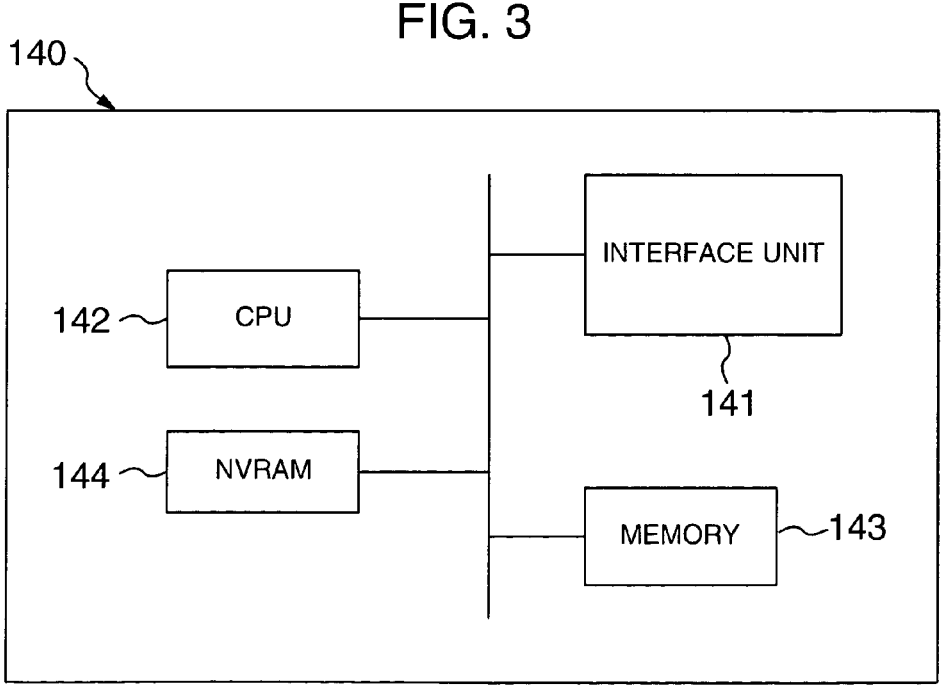
FIG. 3 shows the hardware configuration of a disk control unit 140 according to an embodiment of the present invention.

Next, FIG. 3 shows the hardware configuration of the disk control unit 140. The disk control unit 140 is provided with an interface unit 141, a memory 143, a CPU 142 and a NVRAM 144.

The interface unit 141 is provided with a communication interface which communicates with the channel control unit 110 and the like via the connection unit 150 and a communication interface which communicates with the physical disk.

The CPU 142 is in charge of the overall control of the disk control unit 140 and also communicates with the channel control unit 110 and the physical disk. The function of the disk control unit 140 according to the embodiment of the present invention is implemented by executing a plurality of kinds of programs stored in the memory 143 and the NVRAM 144. The function implemented by the disk control unit 140 includes control of the physical disk and RAID control, duplication management and backup control of data stored in the physical disk, data replication function, and the like.

The NVRAM 144 is a nonvolatile memory which stores program in charge of the control of the CPU 142.

Further, the storage device 600 may have a configuration other than the one described above, for example, the one which functions as a NAS (Network Attached Storage) constructed to receive a data input/output request designating file name from the information processing unit 200 by a protocol such as NFS (Network File System).

Duplication Management Function

The duplication management function is a function which when there is data writing to a first logical volume (hereinafter it is called a main volume) 310 arranges to write the data also to a second logical volume (hereinafter it is called a sub-volume) 310. Namely, it is a function to store a duplicate of the data stored in the main volume 310 also in the sub-volume 310. By this duplication management function, the storage device 600 can manage the data in a plurality of logical volumes 310. Therefore, the data redundancy management is implemented and the availability of data can be improved. Moreover, the duplication management function can be called a mirroring function in logical volume 310 units.

In the duplication management function, when data has been written to the main volume, the data is also to be written to the sub-volume as described above, and as a method for this operation there are a synchronous method and an asynchronous method. Of these methods in the synchronous method when there is data writing to the main volume 310, after the data is written in both of the main volume 310 and the sub-volume 310, its completion notice is sent to the information processing unit 200. As in the synchronous method the writing to the information processing unit 200 is not performed until the data writing to both of the main volume 310 and the sub-volume 310 has been completed, the response to the information processing unit 200 tends to be late, but as the completion report is sent after the data has been written in both of the volumes, the consistency of the contents of the main volume 310 and the sub-volume 310 is obtained with high reliability. On the other hand, in the asynchronous method, when data was written to the main volume 310, its completion notice is sent to the information processing unit 200 regardless of whether the data writing to the sub-volume has been conducted or not. Therefore, in the asynchronous method the response to the information processing unit 200 is done quickly, but the consistency of the contents of the main volume 310 and the sub-volume 310 is likely to be harder to obtain compared to the synchronous method.

The duplication management function is implemented by that the CPU 142 of the disk control unit 140 executes a duplication management program which is a program for duplication management stored in the NVRAM 144.

That in which another logical volume 310 the duplicate of the data to be stored in a logical volume 310 should be stored, namely, how to correlate the main volume 310 with the sub-volume 310 can be set by the user or the like by operating the managing computer 700. The data set in this manner is to be stored in the NVRAM 144. The duplication management program implements the control of the duplication management function according to the data stored in the NVRAM 144.

In the duplication management function, the above-mentioned control which arranges to write data to the sub-volume 310 immediately when data was written to the main volume 310 (a condition in which such control is performed is called a pair condition) can be temporarily suspended. The process to suspend the above-mentioned control like this is called a split process, a condition in which the above-mentioned control is suspended is called a split condition. It is possible to resume the suspended control and shift the condition to the pair condition again. The process to shift the split condition to the pair condition like this is called a resynchronization process (resynch process). The split process is performed, for example, when obtaining a backup of data, when performing maintenance of database, when performing batch processing, and so on. On the other hand, the resynch process is performed, for example, when the user wants to manage data in a plurality of logical volumes 310 again.

When the split process is performed, it shifts the relation between the main volume 310 and the sub-volume 310 from the pair condition to the split condition. And, without affecting the operation of the main volume 310, the storage device 600 can create a backup of the data in the sub-volume 310 to a recording medium such as a cartridge tape, an information processing unit 200 can maintain the database of the sub-volume 310, an information processing unit 200 can perform batch processing to the sub-volume 310. This is effective, for example, when the storage system is applied to the online business of a bank and the main volume 310 is used to store real type transaction data which is sent from a terminal such as ATM (automated [automatic] teller machine) and the like. Namely, by performing backup, maintenance, or batch processing with the sub-volume 310 as an object, a variety of processes can be performed without suspending the operation of the automated [automatic] teller machine.

Here, in the split condition, even when the data in the main volume 310 has been updated, the contents of the update are not reflected to the sub-volume 310 immediately. However, the storage device 600 stores the contents of the data update which was performed to the main volume 310 while shifting to the split condition. Therefore, when shifting from the split condition to the pair condition, the storage device 600 can reflect the contents of the data update which it stored to the sub-volume 310 in the resynch process. Also, in the resynch process, data which does not exist in the main volume 310 but exists in the sub-volume 310 is to be erased. By this resynch process the contents of the main volume 310 and the sub-volume 310 are to be consistent. Further, the contents of data update is managed, for example, for each block or track which is an area management unit set in the storage area of the logical volume 310.

The change of the condition of the pair of the main volume 310 and the sub-volume 310, for example, the shift from the pair condition to the split condition, the shift from the split condition to the pair condition, may be set by the user by operating the managing computer 700, or may be set by a timer. The data set in this manner is stored in the NVRAM 144. The duplication management program performs the control of the duplication management function according to the data stored in the NVRAM 144.

Data Replication Function

The data replication function (it is sometimes called a remote copy function) is a function which arranges to store the data to be stored in the main volume 310 of the storage device 600 located in a first site (hereinafter it is called a primary site) also in the sub-volume 310 of the storage device 610 located in a second site (hereinafter it is called a secondary site). In the data replication function, the primary site and the secondary site are generally located in remote locations (e.g., Tokyo and Osaka). The typical object of the installation of the data replication function is to prevent data erasure when a disaster occurs (a disaster recovery).

The data replication function is a function similar to the duplication management function in that it stores the data in the main volume 310 also in the sub-volume 310, but it is different from the duplication management function in that in the data replication function the main volume 310 and the sub-volume 310 are the logical volumes of different storage devices. In the data replication function as well as in the duplication management function, as a method of data writing there are a synchronous method and an asynchronous method. Also, regarding the function of shifting from the pair condition to the split condition or from the split condition to the pair condition, there is provided the same function as the duplication management function.

Change Process of the Condition of the Pair

Figure 4:
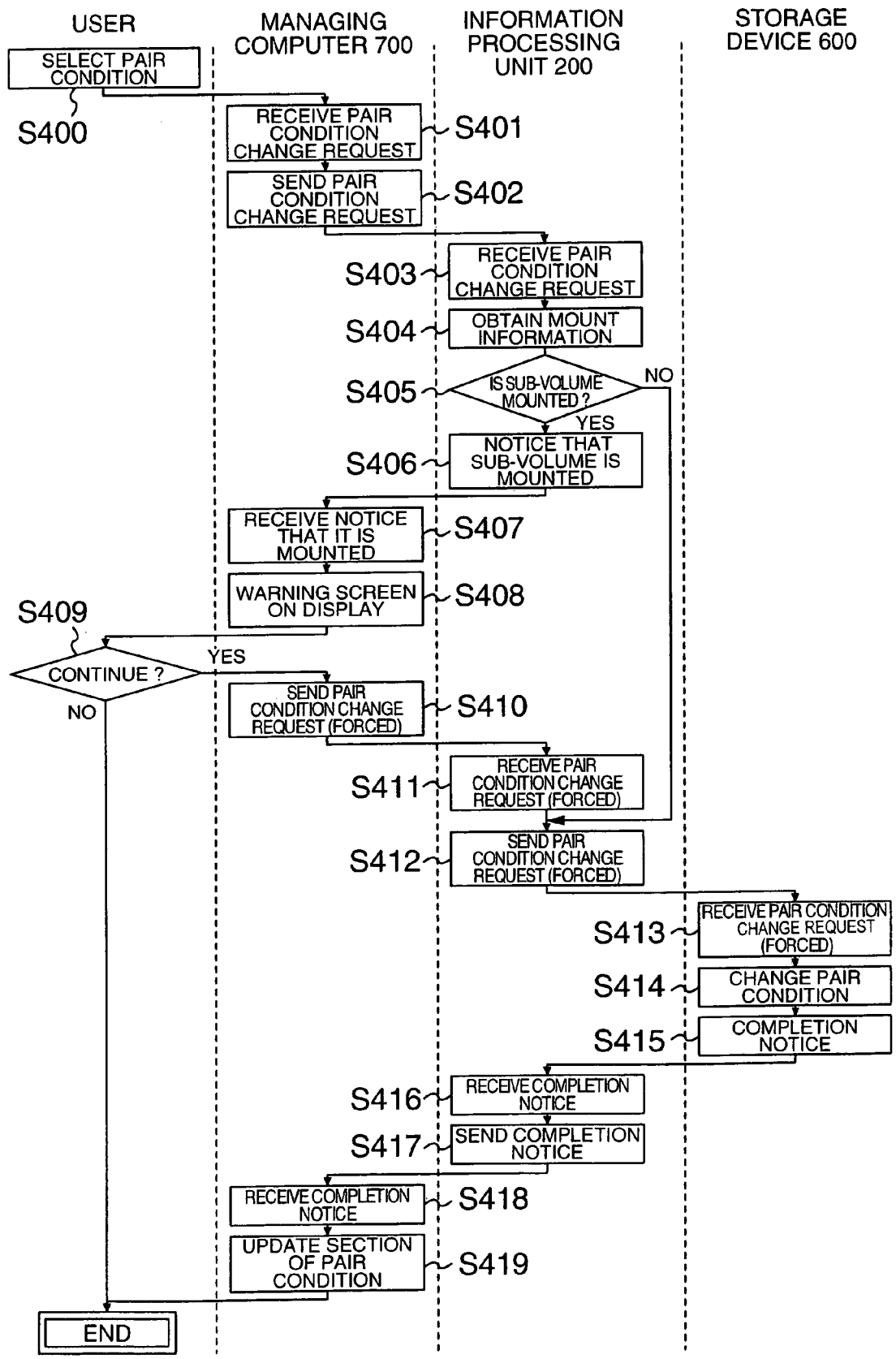
FIG. 4 is a flow chart explaining a process to change the pair condition from the split condition to the pair condition.

As described above, the user can operate the managing computer 700 to shift the condition of the pair of the main volume 310 and the sub-volume 310 from the split condition to the pair condition. FIG. 4 is a flow chart explaining a process to change the condition of the pair of the main volume 310 and the sub-volume 310 from the split condition to the pair condition. The change of the condition of the pair of the main volume 310 and the sub-volume 310 can be performed using a setting Web page or a setting screen which a GUI (Graphical User Interface) function of the managing computer 700 provides. FIG. 5 shows an example of the setting Web page.

In FIG. 5 information concerning each logical volume 310 is shown. More specifically, information such as an identifier of each logical volume 310, an identifier of the storage device 600 which is provided with each logical volume 310, a role of each logical volume 310, a condition of the pair, a change of the condition of the pair, an identifier of paired logical volume 310 with which the logical volume forms a pair, and an identifier of the storage device 600 which is provided with this logical volume 310, is shown. These pieces of information can be obtained from the disk control unit 140 of the storage device 600 but it may be arranged to be obtained from the information processing unit 200.

Further, in the section of the role of the logical volume 310, the role which the user and the like set operating the managing computer 700 as described above, namely, main volume, sub-volume, not forming a pair (-) where (-) denotes "n/a (not assigned)", and the like is indicated. In the section of the condition of the pair, it is shown which condition the logical volume 310 is currently in. More specifically, pair condition, split condition and the like is indicated. The section of the change of the pair is, for example, a section in which the pair condition can be changed by a pull-down menu.

In this setting Web page, when the user or the like selects the pair condition at the pair condition change section to change the condition of the pair of the main volume 310 and the sub-volume 310 from the split condition to the pair condition (S400), the managing computer 700 receives a change request of the pair (S401). Then, the managing computer 700 sends a pair condition change request including the identifier of the requested sub-volume 310 to an information processing unit 200 which is allocated to the requested sub-volume 310 in order to inquire the information processing unit 200 of whether it mounts the requested sub-volume 310 or not (S402). Here, "mount the logical volume" means to make the logical volume ready to be read and written from the information processing unit 200.

On receiving the pair condition change request (S403) the information processing unit 200 obtains the identifier of the accessible logical volume 310 and information as to whether each logical volume 310 is mounted or not (mount information) in order to confirm whether it mounts the requested sub-volume 310 or not (S404). These identifier and information can be obtained, for example, by an operating system in the information processing unit 200.

From the obtained identifier and information, the information processing unit 200 decides whether it mounts the requested sub-volume 310 or not (S405). When it decides that the requested sub-volume 310 is not mounted as a result (S405; No), the process jumps to the (S412).

On the other hand when it decides that the requested sub-volume 310 is mounted (S405;Yes), the information processing unit 200 gives notice to the managing computer 700 that the requested sub-volume 310 is mounted (S406).

When the managing computer 700 receives the notice that the sub-volume 310 is mounted from the information processing unit 200 (S407), it displays a warning on the display screen of the managing computer 700 (S408). Further, in the embodiment of the present invention, the warning window is presented on the display of the managing computer 700, but as long as the message that the sub-volume 310 is mounted can be output to the user interface of the managing computer 700, any means can be taken. For example, an alarm sound may be output from the speaker of the managing computer 700.

FIG. 6 shows an example of a warning screen displayed on the display of the managing computer 700. As shown in FIG. 6, the managing computer 700 inquires of the user whether the pair condition change process should be continued or not displaying the warning screen (S409).

To this inquiry, when the user selects "No" (S409;No) the process completes the pair condition change process without changing the section of the condition of the pair in FIG. 5. On the other hand, when the user selects "Yes" (S409; Yes) the process proceeds to (S410). Then, the managing computer 700 sends a pair condition change request (forced) to the information processing unit 200 which mounts the sub-volume 310 in order to execute the pair condition change forcibly (S410).

When the information processing unit 200 which mounts the sub-volume 310 receives the pair condition change request (forced) from the managing computer 700 (S411), it sends the pair condition change request (forced) to the storage device 600 (S412).

When the storage device 600 receives the pair condition change request (forced) (S413), the storage device 600 performs the resynch process to change the pair condition in order to shift the relation between the main volume and the sub-volume selected by the user from the split condition to the pair condition (S414). When the change of the pair condition is completed, the storage device 600 gives notice to the information processing unit 200 which sent the pair condition change request (forced) that the change of the pair condition is completed (S415).

On receiving the notice that the change of the pair condition is completed (S416), the information processing unit 200 sends the completion notice to the managing computer 700 (S417).

On receiving the completion notice from the information processing unit 200 (S418) the managing computer 700 completes the change process of the pair condition updating the section of the condition of the pair in FIG. 5 from the split condition to the pair condition (S419). Here, in (S419), a message saying that the change of the pair condition has been completed as shown in FIG. 7 maybe displayed on the display of the managing computer 700. Also, it may be arranged to update the section of the condition of the pair in FIG. 5 from the split condition to the pair condition with displaying the message saying that the change of the pair condition has been completed as shown in FIG. 7 on the display of the managing computer 700.

By the above-described process, it can be obtained that data newly generated by the maintenance of a database or data newly generated by batch processing is not erased immediately, even when the user executes the resynch process without knowing which information processing unit 200 mounts which logical volume 310. Namely, even if the user executes the resynch process without intending, the data newly generated in the split condition can be guarded.

Moreover, in the above description there has been explained in detail about the sub-volume 310, but the present invention can be applied to the case of the main volume 310. Namely, the present invention can be applied in case where the contents of the main volume 310 are made to be consistent with the contents of the sub-volume 310.

Also, the present invention may be applied to the case where the process is to newly initiate the pair condition between a logical volume 310 and another logical volume 310. Thereby, data in a logical volume 310 which is to be set as a sub-volume can be protected. Further, the present invention also can be applied to the case where a series of controls (pair condition→split condition→pair condition) is to be newly initiated between a logical volume 310 and another logical volume 310.

Moreover, the main volume 310 and the sub-volume 310 may be provided in the same storage device 600 or may be provided in separate storage devices 600, 610.

There has been described about the embodiments of the present invention, but above described embodiments are to make it easy to understand the present invention, and are not to limit the interpretation of the present invention. The present invention can be changed and modified without departing from the spirit and scope of the invention, and the equivalents are included in the present invention.

As described above, according to the present invention a storage system control method, a storage system, an information processing unit, a managing computer and a program can be provided.

What is claimed is:

1. A control method for a storage system which comprises a plurality of information processing units, a managing computer, a storage device provided with a plurality of logical volumes, and a user interface, said control method comprising:

performing a first process in which when a data write request to a first logical volume is sent from the information processing unit to the storage device the storage device stores data in the first logical volume and also stores the data in a second logical volume;

performing a second process in which the storage device suspends the first process;

shifting from the second process to the first process to perform the first process;

when shifting from the second process to the first process to perform the first process, inquiring an information processing unit which can access the second logical volume, of whether said information processing unit mounts the second logical volume or not;

deciding whether said information processing unit mounts the second logical volume or not;

when the information processing unit mounts the second logical volume, outputting that effect from said user interface before shifting to the first process;

accepting a change of pair condition between said first logical volume and said second logical volume at the managing computer, wherein said accepted change comprises a shift from said second process to said first process initiated through the user interface, wherein said managing computer inquires to an information processing unit accessible to said second logical volume as to whether or not said second logical volume is mounted available to read and write from said information processing unit;

when as a result of said inquiring by the managing computer, if the managing computer finds that said second logical volume is mounted available to read and write from said information processing unit, then outputting an indication that the second logical volume is mounted through the user interface of the managing computer without instructing the change to said pair condition to said information processing unit.

2. A storage system control method according to claim 1, wherein when the information processing unit does not mount the second logical volume the storage device shifts from the second process to the first process to perform the first process.

3. A method according to claim 1, further including:
continuing the change of the pair condition of shifting from said second process to said first process though the user interface, even if it is outputted to the user interface of the managing computer that said information processing unit mounted the second logical volume, and said managing computer sending a request of forced change of said pair condition to said information Processing unit, said information processing unit sends the request of the forced change to said storage device in response to the forced change request, and said storage device shifts said pair condition from said second process to said first process in response to the forced change request.

4. A control method for a storage system which comprises a plurality of information processing units, a managing computer, a storage device provided with a plurality of logical volumes, and a user interface, said control method comprising:

performing a process in which when a data write request to a first logical volume is sent from the information processing unit to the storage device the storage device stores data in the first logical volume and also stores the data in a second logical volume;

when the control is to be newly initiated between the first logical volume and the second logical volume, inquiring an information processing unit which can access the second logical volume, of whether said information processing unit mounts the second logical volume or not;

deciding whether the information processing unit mounts the second logical volume or not; and when the information processing unit mounts the second logical volume, outputting that effect from said user interface without being newly initiated between the first logical volume and the second logical volume;

accepting a change of pair condition between said first logical volume and said second logical volume at the managing computer, wherein said accepted change comprises a shift from said second process to said first process initiated through the user interface, wherein said managing computer inquires to an information processing unit accessible to said second logical volume as to whether or not said second logical volume is mounted available to read and write from said information processing unit;

when as a result of said inquiring by the managing computer, if the managing computer finds that said second logical volume is mounted available to read and write from said information processing unit, then outputting an indication that the second logical volume is mounted through the user interface of the managing computer without instructing the change to said pair condition to said information processing unit.

5. A method according to claim 4, further including:
continuing the change of the pair condition of shifting from said second process to said first process through the user interface, even if it is outputted to the user interface of the managing computer that said information processing unit mounted the second logical volume, and said managing computer sending a request of forced change of said pair condition to said information processing unit, said information processing unit sends the request of the forced change to said storage device in response to the forced change request, and said storage device shifts said pair condition from said second process to said first process in response to the forced change request.

6. A control method for a storage system which comprises a plurality of information processing units, a storage device provided with a plurality of logical volumes, and a managing computer, said control method comprising:

performing a first process in which when a data write request to a first logical volume is sent from the information processing unit to the storage device the storage device stores data in the first logical volume and also stores the data in a second logical volume;

performing a second process in which the storage device suspends the first process;

shifting from the second process to the first process to perform the first process;

when shifting from the second process to the first process to perform the first process, inquiring an information processing unit which can access the second logical volume of whether the information processing unit mounts the second logical volume or not;

deciding whether the information processing unit mounts the second logical volume or not; and when the information processing unit mounts the second logical volume, outputting that effect from a user interface of the managing computer before performing the first process;

accepting a change of pair condition between said first logical volume and said second logical volume at the managing computer, wherein said accepted change comprises a shift from said second process to said first process initiated through the user interface, wherein said managing computer inquires to an information processing unit accessible to said second logical volume as to whether or not said second logical volume is mounted available to read and write from said information processing unit;

when as a result of said inquiring by the managing computer, if the managing computer finds that said second logical volume is mounted available to read and write from said information processing unit, then outputting an indication that the second logical volume is mounted through the user interface of the managing computer without instructing the change to said pair condition to said information processing unit.

7. A method according to claim 6, further including:

continuing the change of the pair condition of shifting from said second process to said first process through the user interface, even if it is outputted to the user interface of the managing computer that said information processing unit mounted the second logical volume, and said managing computer sending a request of forced change of said pair condition to said information processing unit, said information processing unit sends the request of the forced change to said storage device in response to the forced change request, and said storage device shifts said pair condition from said second process to said first process in response to the forced change request.

8. A control method for a storage system which comprises a plurality of information processing units, a managing computer, a first storage device provided with a first logical volume in a first site, a second storage device provided with a second logical volume in a second site, said method comprising:

performing a first process in which when a data write request to the first logical volume is sent from the information processing unit to the first storage device the first storage device stores data in the first logical volume, the first storage device sends the data to the second storage device, and the second storage device which receives the data stores the data in the second logical volume;

performing a second process in which the second storage device suspends the first process;

the second storage device shifting from the second process to the first process to perform the first process;

when shifting from the second process to the first process to perform the first process, inquiring an information processing unit which can access the second logical volume of whether the information processing unit mounts the second logical volume or not;

deciding whether the information processing unit mounts the second logical volume or not; and when the information processing unit mounts the second logical volume, outputting that effect from a user interface before shifting to the first process;

accepting a change of pair condition between said first logical volume and said second logical volume at the managing computer, wherein said accepted change comprises a shift from said second process to said first process initiated through the user interface, wherein said managing computer inquires to an information processing unit accessible to said second logical volume as to whether or not said second logical volume is mounted available to read and write from said information processing unit;

when as a result of said inquiring by the managing computer, if the managing computer finds that said second logical volume is mounted available to read and write from said information processing unit, then outputting an indication that the second logical volume is mounted through the user interface of the managing computer without instructing the change to said pair condition to said information processing unit.

9. A method according to claim 8, further including:

continuing the change of the pair condition of shifting from said second process to said first process through the user interface, even if it is outputted to the user interface of the managing computer that said information processing unit mounted the second logical volume, and said managing computer sending a request of forced change of said pair condition to said information processing unit, said information processing unit sends the request of the forced change to said storage device in response to the forced change request, and said storage device shifts said pair condition from said second process to said first process in response to the forced change request.

10. A storage system control method according to claim 8, wherein when the information processing unit does not mount the second logical volume the second storage device shifts from the second process to the first process to perform the first process.

11. A storage system connectable to a plurality of information processing units, a managing computer, a storage device provided with a plurality of logical volumes, and a user interface, said storage system comprising:

means for performing a first process in which when a data write request to a first logical volume is sent from the information processing unit to the storage device the storage device stores data in the first logical volume and also stores the data in a second logical volume;

means for performing a second process in which the storage device suspends the first process;

means for shifting from the second process to the first process to perform the first process;

means for inquiring an information processing unit which can access the second logical volume of whether the information processing unit mounts the second logical volume or not when shifting from the second process to the first process to perform the first process;

means for deciding whether the information processing unit mounts the second logical volume or not;

means for, when the information processing unit mounts the second logical volume, outputting that effect from said user interface before shifting to the first process;

means for accepting a change of pair condition between said first logical volume and said second logical volume at the managing computer, wherein said accepted change comprises a shift from said second process to said first process initiated through the user interface, wherein said managing computer inquires to an information processing unit accessible to said second logical volume as to whether or not said second logical volume is mounted available to read and write from said information processing unit;

means for, when as a result of said inquiring by the managing computer, if the managing computer finds that said second logical volume is mounted available to read and write from said information processing unit, then outputting an indication that the second logical volume is mounted through the user interface of the managing computer without instructing the change to said pair condition to said information processing unit.

12. A system according to claim 11, further including:

means for continuing the change of the pair condition of shifting from said second process to said first process through the user interface, even if it is outputted to the user interface of the managing computer that said information processing unit mounted the second logical volume, and said managing computer sending a request of forced change of said pair condition to said information processing unit, said information processing unit sends the request of the forced change to said storage device in response to the forced change request, and said storage device shifts said pair condition from said second process to said first process in response to the forced change request.

13. A managing computer connectable to a storage system which comprises a plurality of information processing units and a storage device provided with a plurality of logical volumes, said managing computer comprising:
   means for shifting from a second process to a first process to perform the first process;
   means for inquiring an information processing unit which can access a second logical volume of whether the information processing unit mounts the second logical volume or not when shifting from the second process to the first process to perform the first process, wherein said first process is that the storage device stores data in a first logical volume and also stores the data in the second logical volume, wherein said second process is that the storage device suspends the first process; and
   means for, when the information processing unit mounts the second logical volume, outputting that effect from said user interface before shifting to the first process;
   means for accepting a change of pair condition between said first logical volume and said second logical volume at the managing computer, wherein said accepted change comprises a shift from said second process to said first process initiated through the user interface, wherein said managing computer inquires to an information processing unit accessible to said second logical volume as to whether or not said second logical volume is mounted available to read and write from said information processing unit;
   means for, when as a result of said inquiring by the managing computer, if the managing computer finds that said second logical volume is mounted available to read and write from said information processing unit, then outputting an indication that the second logical volume is mounted through the user interface of the managing computer without instructing the change to said pair condition to said information processing unit.

14. A managing computer according to claim 13, further including:
   means for continuing the change of the pair condition of shifting from said second process to said first process through the user interface, even if it is outputted to the user interface of the managing computer that said information processing unit mounted the second logical volume, and said managing computer sending a request of forced change of said pair condition to said information processing unit, said information processing unit sends the request of the forced change to said storage device in response to the forced change request, and said storage device shifts said pair condition from said second process to said first process in response to the forced change request.

15. A computer-readable storage medium having a program for a managing computer in a storage system comprising a plurality of information processing units and a storage device provided with a plurality of logical volumes, said program comprising:
   code for performing a first process in which when a data write request to a first logical volume is sent from the information processing unit to the storage device the storage device stores data in the first logical volume and also stores the data in a second logical volume,
   code for performing a second process in which the storage device suspends the first process,
   code for shifting from the second process to the first process to perform the first process,
   code for inquiring an information processing unit which can access the second logical volume of whether the information processing unit mounts the second logical volume or not when shifting from the second process to the first process to perform the first process,
   code for deciding whether the information processing unit mounts the second logical volume or not, code for, when the information processing unit mounts the second logical volume, outputting that effect from a user interface of the managing computer before shifting to the first process,
   code for accepting a change of pair condition between said first logical volume and said second logical volume at the managing computer, wherein said accepted change comprises a shift from said second process to said first process initiated though the user interface, wherein said managing computer inquires to an information processing unit accessible to said second logical volume as to whether or not said second logical volume is mounted available to read and write from said information processing unit;
   code for, when as a result of said inquiring by the managing computer, if the managing computer finds that said second logical volume is mounted available to read and write from said information processing unit, then outputting an indication that the second logical volume is mounted though the user interface of the managing computer without instructing the change to said pair condition to said information processing unit.

16. A computer-readable storage medium according to claim 15, further including:
   code for continuing the change of the pair condition of shifting from said second process to said first process through the user interface, even if it is outputted to the user interface of the managing computer that said information processing unit mounted the second logical volume, and said managing computer sending a request of forced change of said pair condition to said information processing unit, said information processing unit sends the request of the forced change to said storage device in response to the forced change request, and said storage device shifts said pair condition from said second process to said first process in response to the forced change request.

* * * * *